United States Patent [19]

Stoller et al.

[11] Patent Number: 5,105,080
[45] Date of Patent: Apr. 14, 1992

[54] METHOD AND APPARATUS FOR DETERMINING THE RESPECTIVE CONTRIBUTIONS OF BOREHOLE AND EARTH FORMATION IN GAMMA RAY SPECTROSCOPY

[75] Inventors: Christian Stoller, Kingwood; Robert A. Adolph, Houston, both of Tex.

[73] Assignee: Schlumberger Technology Corporation, Houston, Tex.

[21] Appl. No.: 679,468

[22] Filed: Apr. 2, 1991

[51] Int. Cl.[5] .............................................. G01V 5/10
[52] U.S. Cl. .................................... 250/270; 250/266
[58] Field of Search ............... 250/270, 264, 265, 266, 250/253

[56] References Cited

U.S. PATENT DOCUMENTS

| | | |
|---|---|---|
| 3,521,064 | 7/1970 | Moran et al. |
| 3,890,501 | 6/1975 | Johnstone |
| 4,129,777 | 12/1978 | Wahl et al. |
| 4,423,323 | 12/1983 | Ellis et al. |
| 4,445,033 | 4/1984 | Preeg et al. |
| 4,454,420 | 6/1984 | Smith, Jr. |
| 4,464,569 | 8/1984 | Flaum |
| 4,507,554 | 3/1985 | Hertzog et al. |
| 4,661,701 | 4/1987 | Grau |
| 4,721,853 | 1/1988 | Wraight |
| 4,788,424 | 11/1988 | Preeg |
| 4,810,876 | 3/1989 | Wraight et al. |
| 4,816,674 | 3/1989 | Ellis et al. |
| 4,937,446 | 6/1990 | McKeon et al. |

OTHER PUBLICATIONS

"Response of the Carbon/Oxygen Measurement for an Inelastic Gamma Ray Spectroscopy Tool" by B. A. Roscoe and J. A. Grau, SPE #14460, presented at the 1985 SPE Annual Tech. Conf. and Exh. held in Las Vegas, Sep. 22-25, 1985.

Primary Examiner—Janice A. Howell
Assistant Examiner—Richard Hanig
Attorney, Agent, or Firm—Henry N. Garrana; John H. Bouchard

[57] ABSTRACT

A apparatus and an apparatus for determining the respective contributions in spectroscopy measurements of the borehole and the earth formations surrounding the borehole, derived from the detection of gamma rays resulting from the collisions of neutrons with atoms of the formation or the borehole. From gamma rays from a near and far detector, and established, at each depth, responses (e.g. elemental yields) representative of the values of an unknown in the borehole and in the formation. The far detector response is plotted against the near detector response. From the plot and from known conditions of the detection, is derived a closed curve characteristic of the relative contributions of the borehole and the formation in the responses. For each depth, the respective values of the unknown are derived from the position on the plot of the couple of responses for that depth, with respect to the closed curve. For instance, on a plot of $C/(C+O)$ yields, the curve is a parallelogram two concurrent sides of which form a coordinate system; the coordinates of each response corresponds to the values of the unknown respectively for the formation and the borehole.

38 Claims, 4 Drawing Sheets

METHOD AND APPARATUS FOR DETERMINING THE RESPECTIVE CONTRIBUTIONS OF BOREHOLE AND EARTH FORMATION IN GAMMA RAY SPECTROSCOPY

BACKGROUND OF THE INVENTION

1. Field of the Invention

This invention relates to nuclear measurements involving the spectroscopic analysis of energy spectra of gamma rays resulting from the interaction of neutrons with atoms of elements constituting an unknown material. The invention can find application in nuclear well logging techniques, wherein a sonde is lowered in a borehole and carries out spectral measurements from which is derived information about the composition of the earth formation surrounding the borehole, or the borehole fluid, or the annulus including casing and cement located between the borehole wall and the formation.

2. Related Art

A major goal of well logging is to obtain quantitative and qualitative information related to hydrocarbons in earth formation surrounding a borehole. A substantial part of nuclear well logging techniques are based on spectral analysis of energy spectra of gamma rays resulting from interactions of atoms with neutrons emitted from the sonde, such gamma rays being representative of certain atoms of the lithology (i.e. the matrix or the formation fluid) or of the borehole.

However, the gamma rays detected are representative of both the formation and the borehole. Thus, it is important to determine respective contributions of the borehole and the formation. In order to penetrate the formation, the fast neutrons must pass through the fluid contents of the borehole before entering the formation. The resulting borehole contributions to the gamma ray spectra significantly complicate the analysis of the formation composition. The problem is all the more complex since the sensitivity of the detector(s) to the radiations coming from the borehole and the formation, is a function of many parameters, such as, to name a few, lithology, porosity, borehole size, casing size/weight/eccentricity, cement quality, or borehole fluid composition.

One way of accounting for these contributions is to calibrate the logging tool in a reference borehole having known borehole contents and formation compositions. However, this requires a large number of calibration measurements. Also laboratory conditions do not necessarily reflect the real composition of the contents of the borehole, so inaccuracies can result in the constituent proportions obtained from the spectra matching process. Taking more accurate account of the composition of an individual borehole's contents would enable more accurate information to be obtained concerning the constituents of the earth formations surrounding a borehole. Although the composition of the contents of the borehole may be determined with other logging tools, the use of the logs from such tools to correct the spectral analysis requires accurate recording of the measurements and of the corresponding positions along the borehole. Separate borehole passes may be required for each measurement, contributing further to errors which arise from merging the data to assure depth correspondence. Also, each additional log requires additional expense and delay and contributes further errors. Finally, some necessary data might simply not be available; for example, the borehole diameter is no longer available once a casing has been put in the well.

Another known way to assert the borehole influence on the measurements is to use two detectors having different sensitivities to gamma rays. One detector is preferentially sensitive to gamma rays coming from the formation, while the other preferentially receives gamma rays from the borehole. This differential sensitivity can be achieved e.g. by shielding (U.S. Pat. No. 4,937,446), and/or by specific geometrical configuration of the detectors (U.S. Pat. Nos. 4,721,853 or 4,445,033 or 3,890,501). Nevertheless, these mechanical arrangements, besides adding complexity to the logging sonde, cannot fully discriminate the borehole radiations from the formation radiations.

In case the gamma ray measurements are carried out with a single detector, one needs a reference, based on additional information, such as a prior knowledge of certain parameters and/or geometrical/physical configuration of the borehole under investigation. For instance, such reference can be based on calibrations in situ carried out in a known portion of the borehole and providing a value or values of a given parameter (e.g. water/oil fraction). However, improper selection or unavailability of a zone in the borehole having known characteristics can lead to incorrect parameter values and thus jeopardize the determination of the ultimate unknown(s).

In most gamma ray measurements, the energy spectra of gamma rays resulting from either the "capture" of thermal neutrons or the "inelastic" collisions of neutrons with atoms, after being decomposed into contributions due to individual atomic elements, usually called "elemental yields", reveal information concerning the presence of earth formations elements such as hydrogen, silicon, calcium, chlorine, sulfur and iron. Important petrophysical parameters can be derived from the elemental yields, such as porosity, matrix lithology, and water salinity. Examples of capture gamma ray spectra analysis are depicted in U.S. Pat. Nos. 3,521,064 to Moran et al., 4,464,569 to Flaum, 4,507,554 to Hertzog & Nelligan, 4,661,701 to Grau, 4,810,876 to Wraight et al. U.S. Pat. No. 4,937,446 to Roscoe, Stoller and McKeon shows an inelastic gamma ray spectral analysis. All the above mentioned patents are assigned to the assignee of the present application, and are as well incorporated herein by reference. An example of inelastic gamma ray spectroscopy is the so-called C/O measurement, the purpose of which is to determine oil and water saturation in the formation and in the borehole. The C/O measurement involves the determination of either the ratio of carbon to oxygen count rates in two respective energy windows (see U.S. Pat. No. 4,454,420) or the ratio of carbon and oxygen yields (see U.S. Pat. No. 4,937,446). The water saturation "$S_w$" is determined from the C/O yields ratio, from the porosity PHI (known e.g. from other logs), and from external knowledge such as the lithology (from other logs) or the hydrocarbon fraction in the borehole (from calibrations in situ and preparation of the well comprising circulating known fluid in the well). Each measured C/O value is plotted against the known porosity PHI. The plot includes two sets of reference lines established in known configurations, with one set relating to a water filled borehole and another set to an oil filled borehole. Depending upon the position of the measured value on the plot with respect to the reference lines, one can derive $S_w$. This interpretation technique, described in #14460 "Response of the Carbon/Oxygen Measurements for an Inelastic Gamma Ray Spectroscopy Tool" by B. A. Roscoe & J. A. Grau, presented at the 1985 SPE Annual Technical Conference and Exhibit held in Las Vegas, Sept. 22-25, 1985, relies heavily on information from other sources, which might not always be available or reliable.

It has been proposed, as depicted in U.S. Pat. No. 4,507,554 to Hertzog and Nelligan, assigned to the assignee of the present application, a method of determining the composition of the borehole material in which an early and a late spectrum of capture gamma rays are obtained in respective time periods following the neutron burst. The recorded spectra are analyzed using sets of standard spectra specific to each time period. It is assumed that the earlier of the two capture spectra contains information about both the borehole and the formation, whereas the later capture spectrum contains information only, or at least primarily, about the formation. Accordingly, the difference between the constituent analyses derived from the capture spectra is taken to indicate the composition of the borehole. This technique has the disadvantage that the time period between successive neutron bursts may be relatively long, to allow the radiation emanating from the borehole constituents to subside sufficiently before the second capture spectrum is recorded. Consequently, the logging speed must be relatively low, or alternatively poor depth resolution of the logs must be accepted. In addition, the assumption of little or no borehole contribution to the second capture spectrum is only an approximation, and thus does not necessarily reflect the real environment in which the spectral measurements are made.

Also, a method for correcting for the borehole effect in inelastic gamma ray spectroscopy has been described in SPE paper #14460 already referred to. The depicted method aims at determining the parameters upon which depend the carbon-to-oxygen ratio and is based on the assumption that porosity and lithology are both known.

The 446' Patent already referred to, describes a logging sonde designed for C/O yield measurement and provided with a near and a far detector. The relative amounts of carbon and oxygen $C^n$, $O^n$ as measured from the near detector, and the relative amounts of carbon and oxygen $C^f$, $O^f$, as measured from the far detector, are obtained. A least squares analysis is performed to determine $C^n$, $O^n$ from the energy spectrum (counts versus energy) acquired from the near detector, using standard spectra for the near detector. $C^f$ and $O^f$ are determined from the energy spectrum as measured from the far detector using standard spectra for the far detector. The analysis is performed at each logging depth in the borehole. Next, the carbon and oxygen determinations of the near and far detectors are combined to determine oil saturation of the formation ($S_o$) and/or the oil percentage in the borehole ($Y_o$). This is done by assuming that the total carbon and oxygen yields measured as indicated above are equal to the sum of the carbon and oxygen yields from the rock matrix of the formation, the pore space fluid, and the borehole fluid. The term "yield" means here the fractional number of gamma ray counts coming from a specific element. Carbon and oxygen yields may be expressed as a function of $S_o$ (oil saturation in the formation, or percentage of oil in the pore space) and $Y_o$ (the percentage of oil in the borehole), including coefficients which are determined under laboratory conditions by taking at least three measurements under the same conditions except for varying $S_o$ and $Y_o$. Next, a carbon/oxygen ratio is formed for the near and the far detector respectively, i.e. $C^n/O^n$ and $C^f/O^f$, leading to two equations which are solved for $S_o$ and $Y_o$. At each depth in the borehole, a signal representative of oil saturation $S_o$, and water saturation $S_w1-S_o$, and percentage oil in the borehole $Y_o$, is recorded.

Furthermore, capture gamma rays can be used for determining the porosity of the formation. In clean formations whose pores are filled with water or oil, the neutron log reflects the amount of liquid-filled porosity. High-energy neutrons (called fast neutrons), emitted from the sonde, collide with nuclei of the formation materials and, with each collision, lose a certain amount of their energy which depends on the relative mass of the nucleus with which the neutron collides. The greatest energy loss occurs when the neutron strikes a nucleus of practically equal mass, i.e. a hydrogen nucleus. Thus, the slowing of neutrons depends largely on the amount of hydrogen in the formation. Within a few microseconds, the neutrons have been slowed by successive collisions to thermal velocities, corresponding to energies of around 0.025 eV. They then diffuse randomly, without losing more energy, until they are captured by the nuclei of atoms such as chlorine, hydrogen, or silicon. The capturing nucleus becomes intensely excited and emits a high-energy capture gamma ray. Depending on the type of neutron logging sonde, either these capture gamma rays or the neutrons themselves are counted by a detector in the sonde. When the hydrogen concentration of the material surrounding the neutron source is large, most of the neutrons are slowed and captured within a short distance of the source. On the contrary, if the hydrogen concentration is small, the neutrons travel farther from the source before being captured. Accordingly, the counting rate at the detector increases for decreased hydrogen concentration, and vice versa. Examples of implementation of such method can be found in U.S. Pat. Nos. 4,816,674 to Ellis et al. or 4,423,323 to Ellis et al. both assigned to the assignee of the present application.

It has been proposed, as described in U.S. Pat. No. 4,788,424 commonly assigned with the present application, a method for producing an indication of the partition between the borehole and the formation of the constituents identified by detecting and counting capture gamma rays according to their energy in each of two time gates. The resulting energy spectra are analyzed to determine the type and relative gamma ray yield of each constituent of the borehole and formation. A characteristic neutron capture decay time constant for each constituent is derived from the yields and total gamma ray counts in the two time gates, and time constants for the borehole and formation overall are set equal to the derived time constants for constituents, such as iron and silicon, occurring predominantly in the borehole and formation respectively. The partition of the remaining constituents is then determined by considering the characteristic time constant for each constituent to be the sum of the time constants for the borehole and formation regions weighted by the proportion of that constituent in each region, the borehole and formation time constants being assumed the same for all constituents and the sum of the proportions being unity.

It can be understood from the above that compensation or correction for the effects of borehole on the measurements rely on the knowledge of the respective contributions of the borehole and the formation to the measurements. Although the determination of this contribution by either of the above mentioned known methods has proven to be relatively satisfactory in the past, there is a need for improvement, especially for any method which could be less dependent upon external information, such as laboratory calibrations, "in situ" calibrations or other logs. This need is all the more critical when the borehole environment is not sufficiently known (from other sources), or when the validity of a calibration is questionable.

OBJECT OF THE INVENTION

A principal object of this invention is to provide a reliable and efficient method for determining the respective contributions of the borehole and the earth formations in gamma ray spectroscopy logging, especially when no or little information from other sources is available.

SUMMARY OF THE INVENTION

According to the invention, these and further objects are attained by a method for determining the respective contributions in spectroscopy measurements of the borehole and the earth formations surrounding the borehole, comprising:

irradiating the formation with neutrons from a high energy neutron source;

detecting and counting, at each depth in the borehole, at least at a first and at a second location, the gamma rays resulting from the interaction of the neutrons with atoms of the formation and the borehole;

forming, for each depth, at least a first and a second gamma ray response for respectively the first and second detection location, the responses being representative of values of at least one unknown parameter in respective zones in the formation/borehole;

cross plotting each of said first responses versus at least the corresponding second response, in a space having a number of dimension equal to the number of detection locations; with each depth is associated in said space a dot representing the set of responses for that depth;

determining in said space, from the general relationship between the responses and the unknown and from known conditions of the detection, a closed region characteristic of the relative contributions of said respective zones; and determining, for each depth, the respective values of the unknown for said zones, from the position, in said space, of said set of responses for that depth, with respect to said closed region.

According to one embodiment using two detection locations, the space shows two dimensions, the closed region is a closed curve, and the two zones are the borehole and the formation.

The closed curve shows the general form of a quadrilateral, each side defining the boundary value (maximum/minimum) of the unknown in the corresponding partition borehole/formation. The shape of the sides depends on the general relationship between the responses and the unknown.

The closed curve shows the general form of a quadrilateral, the type of which depends on the type of responses used and on the general relationship between the responses and the unknown. From that general relationship is derived, for each side of the quadrilateral, a mathematical function expressing the correspondence between the first responses and the second responses. There are thus four functions, one for each side of the quadrilateral. The general form of such function can be expressed as: $FR = g(SR)$, where "g" is mathematical function the form of which depends on the kind of response, "FR" stands for first responses, "SR" for second responses.

In the particular case where the functions "g" corresponding to the sides are linear, i.e. the sides are straight lines, two concurrent sides of the quadrilateral form a coordinate system the two axes of which correspond to the values of the unknown respectively for the formation and the borehole. The coordinate system is generally non-orthogonal, depending on the kind of response.

More precisely, the values of the unknown may be determined by:

asserting the general shape of the closed curve depending upon the type of responses measured;

deriving geometrical characteristics of the curve from known conditions of the detection;

deriving from at least a first part of the responses the position of the curve on the plot; and deriving for each depth, from the coordinates of each of the cross-plotted responses for that depth, on the coordinate system issued from the curve, the values of the unknown for the borehole and the formation.

Alternately, the first part of the responses allows to derive further geometrical characteristics of the curve.

For instance, geometrical characteristics comprise characteristics of the lines connecting two corners of the curve, such as the slope and length in the case the sides are linear, or the coefficients of the mathematical function representing the side.

In an alternate embodiment, the position of the curve on the plot is derived from prior information obtained from other sources. For example, such prior information is based on the knowledge of the kind of liquid (oil or water) filling the borehole at that depth; the curve is thus bound to pass through the dot representing the known set of first/second responses for that depth.

Also, a second part of the plotted responses can be used to check the correctness of the curve, e.g. its shape, dimensions and/or position.

In a preferred embodiment, the responses are representative of the concentration of an element, or several elements, present in the formation and/or in the borehole, such as e.g. carbon, oxygen, calcium, iron, silicon or chlorine.

More precisely, each of the responses may be made of elemental yields of a single element or several elements, such as hydrogen for porosity measurements, chlorine (Cl) for salinity measurements, calcium (Ca) and silicon (Si) for lithology measurements, or carbon (C) and oxygen (O) for oil/water saturation measurements.

The elemental yields of two or more elements may be combined to form a simple ratio, e.g. C/O, or a complex ratio, e.g. $C/(C+O)$, $(C-O)/(C+O)$, $Cl/(Si+Ca)$, $Si/Ca$, $Si/(Ca+Si)$, or $Si/(Ca+Si+Fe)$, $H/(Si+Ca)$.

In case the responses comprise C yields or a combination of C and O yields, the unknown might be the fraction of oil volume, in the formation called "PHI $S_o$", and in the borehole called "$Y_o$". The fraction of oil volume will be hereafter referred to simply as "oil fraction".

By way of example, in case the responses are C/O yields, the curve is substantially trapezoid shaped with curved sides. In that particular case, the mathematical functions "g", in $FR = g(SR)$, representing the respective curved sides, are of the form: $FR=(a+b\ SR)/(c+d\ SR)$, where "FR" stands for first responses, "SR" for second responses, and "a-d" are coefficients. In case the responses are C/(C+O) yields, the curve shows substantially the shape of a parallelogram, i.e. the hereabove functions "g" representative of the sides, are linear: $FR=m+n\ SR$. The slopes of the sides depend on geometrical factors of the detection, such as the borehole geometry and the position of the tool. The lengths of the sides depend on fluid parameters, such as the amount of borehole fluid and the sensitivity of measurements to the formation fluid and the porosity.

Advantageously, the detection is carried out at two detection locations, i.e. with a near detector and a far detector, longitudinally disposed on one side of the neutron source. The responses from the far detector are plotted against the responses from the near detector.

In another embodiment, the detection is completed with three detectors, and the plot is established in a three dimensional coordinate system.

Alternately, the responses are made of count rates.

The invention also contemplates a logging apparatus for implementing the above mentioned method.

The characteristics and advantages of the invention will appear better from the description to follow, given by way of a nonlimiting example, with reference to the appended drawings in which:

DETAILED DESCRIPTION

Figure 1:
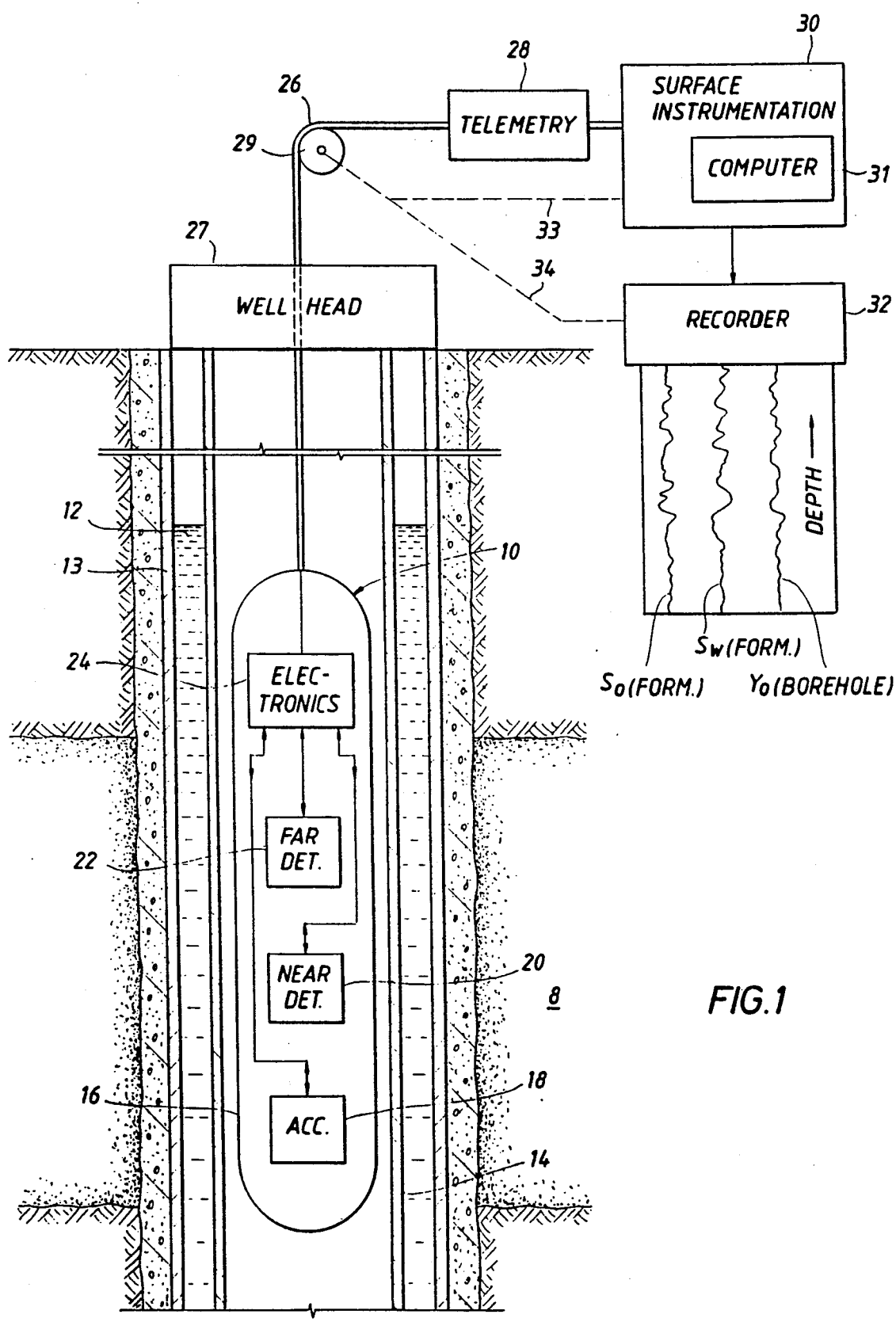
FIG. 1 is a schematic view of an embodiment of a logging sonde that may be utilized in the practice of the invention.

FIG. 1 schematically illustrates a logging sonde 10 disposed in a borehole 12 and including a housing 16 in the shape of a cylindrical sleeve, which is designed for running through either small or large diameter production tubing. Inside housing 16 are disposed an accelerator or pulsed neutron source 18 and a near detector 20 and a far detector 22 mounted longitudinally above accelerator 18, with increasing axial distances. Acquisition, control and telemetry electronics 24 are shown schematically and will be described in more detail below. Electronics 24 serves among other functions, to control the timing of burst cycles of the neutron accelerator 18 the timing of detection time gates for near and far detectors 20, 22, and to telemeter count rate and other data via cable 26 and telemetry circuitry 28 to surface instrumentation 30 which includes computer 31. Computer 31 receives gamma ray spectral data from near and far detectors 20, 22 and processes and combines it to produce a signal representative of formation hydrocarbon (hereafter simply "oil") saturation $S_o$. The signal may be recorded as a function of depth on recorder 32 along with a signal representative of the percentage of oil in the borehole fluid, "$Y_o$". Water saturation $S_w$ may also be recorded.

The schematic illustration of FIG. 1 shows application of the invention through tubing 14 in the well bore 12 which typically is lined with steel casing 13 and cemented in place through formations 8. Well head 27 at the earth's surface communicates with tubing 14. Sheave wheel 29 is shown schematically as controlling the movement of sonde 10 through tubing 14. The depth of the sonde 10 within well bore 12 is measured by encoders associated with sheave 29 as indicated by dotted lines 33, 34 from sheave 29 to computer 30 and recorder 32.

Alternately, sonde 10 may be disposed in a borehole which may be an open hole but is more likely a cased hole beneath production tubing. In most cases, the sonde (called a "through-tubing sonde") includes an eccentering device such as bow spring forcing the housing against the wall of the casing or bore of the borehole.

The neutron accelerator 18 is operated to provide a burst of fast neutrons periodically, such that e.g. 20 microsecond neutron bursts occur in a 100 microsecond cycle time. A first time gate, substantially coinciding with the neutron burst, is used to detect inelastic gamma rays produced by the fast neutrons, while two other following time gates may be used to detect gamma rays produced as the neutrons slow down to thermal energy and are captured by the nuclei of elements of formation or borehole.

Alternately, the two detectors 20, 22 could be disposed in the sonde at the same level, i.e. the detectors are mounted in such a way that one of them faces predominantly the formation and the other one the borehole. The detectors are mounted back-to-back and a shielding could be provided in between.

In any event, the two detectors are mounted in the sonde so that one detector is mostly representative of the formation and the other from the borehole.

The invention is described now in connection with measurements involving the detection of gamma rays resulting from inelastic collisions between the neutrons emitted by the source 18 and atoms of the formation and the borehole. The detected gamma rays will be hereafter referred to as "inelastic gamma rays". Such measurements are directed to the determination of the respective oil fraction in the borehole and in the formation, from which is derived the water fraction in the borehole and in the formation. Oil fraction constitutes the unknown, the determination of which is based on the elemental yields of carbon C and oxygen O; the values of the unknown to be determined are the oil fraction in the formation $S_o$ and the oil fraction in the borehole $Y_o$. The term "yield" means here the fractional number of gamma ray counts coming from a specific element present in the formation and/or in the borehole. Calculation of elemental yields can be carried out by any known method such as the one depicted in the 446' Patent already referred to. Briefly stated, the relative amounts of carbon and oxygen $C^n$, $O^n$ as measured from the near detector and the relative amounts of carbon and oxygen $C^f$, $O^f$, as measured from the far detector, are obtained by searching the best fit, through a least squares analysis, between the energy spectrum (counts versus energy) acquired from the near (respectively far) detector and a standard spectra for the near (respectively far) detector. The analysis is performed at each logging depth in the borehole.

Figure 4:
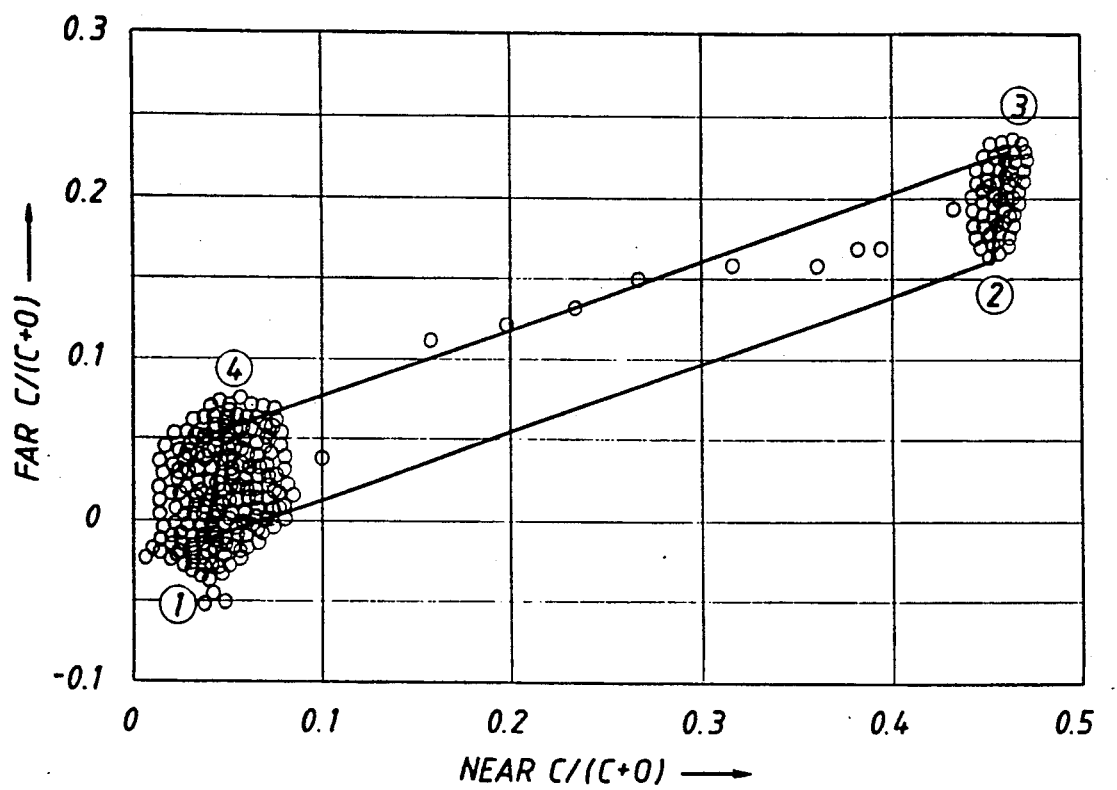
FIG. 4 is an actual plot of elemental yields C/(C+O), one dot corresponding to measurements made at one depth.
Figure 5:
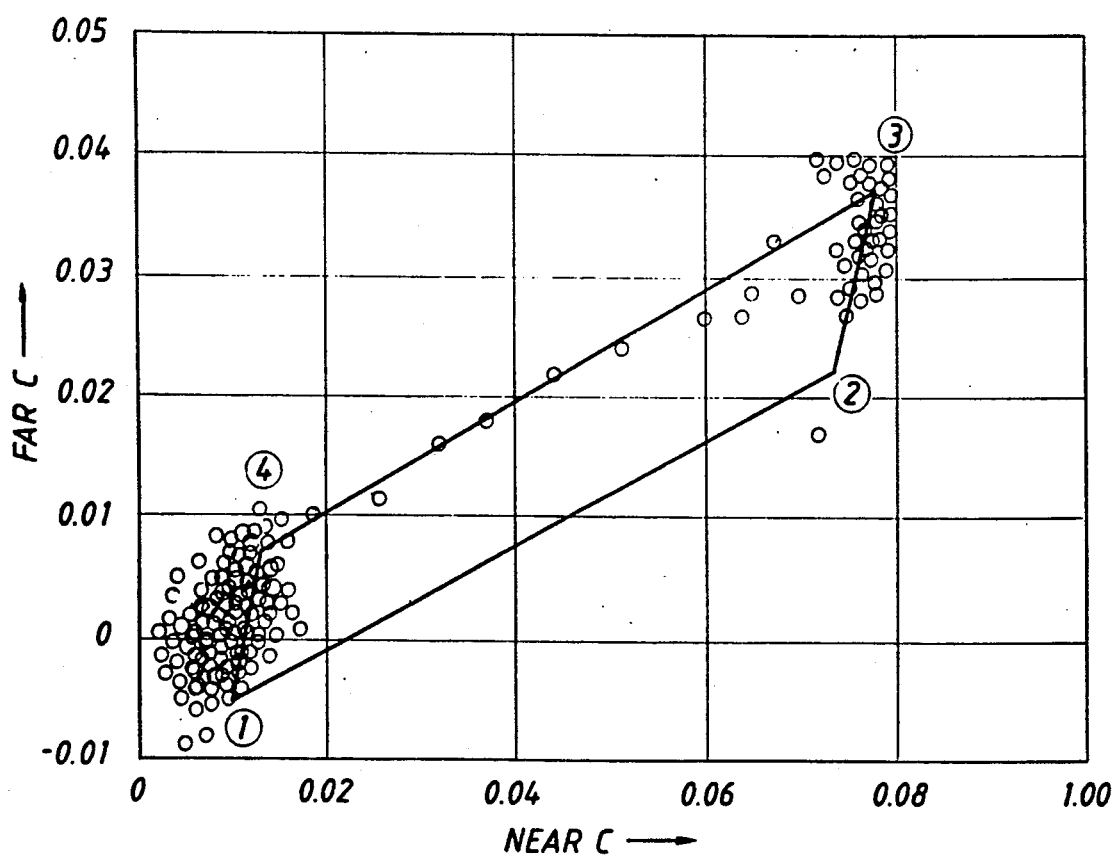
FIG. 5 shows an actual cross-plot of C yields.
Figure 6:
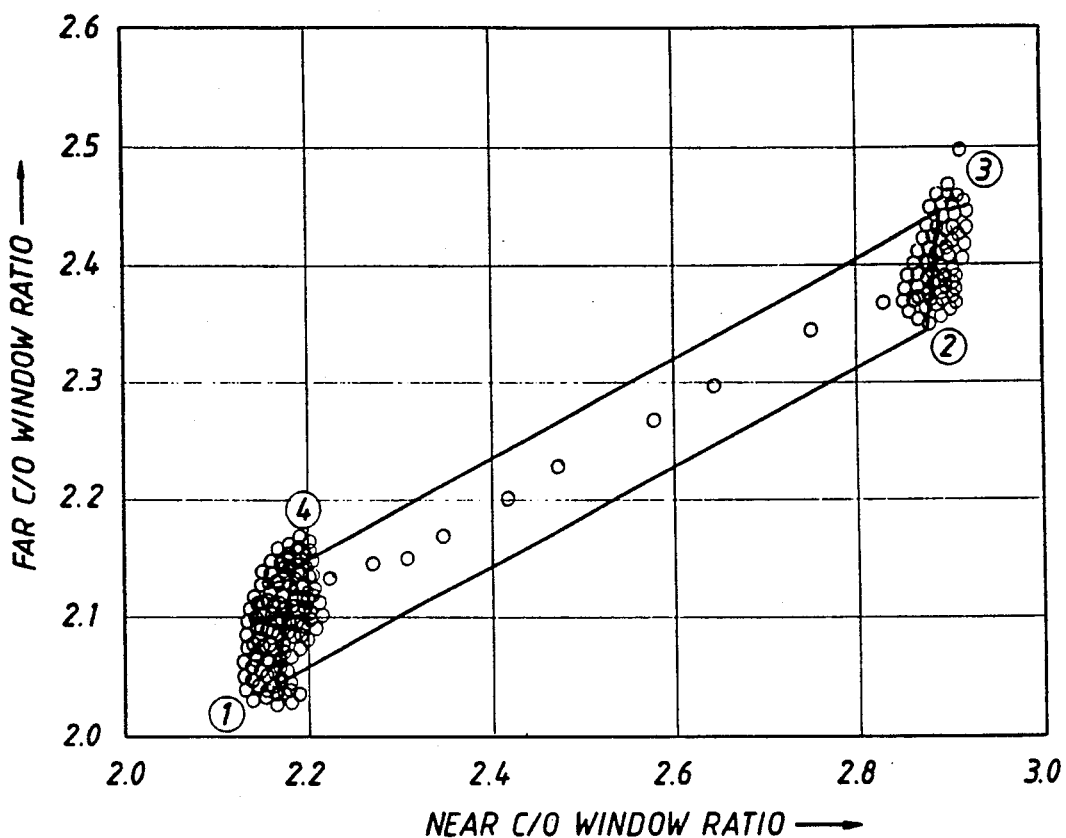
FIG. 6 shows an actual cross-plot of C/O count rates ratio, in energy windows.
Figure 7:
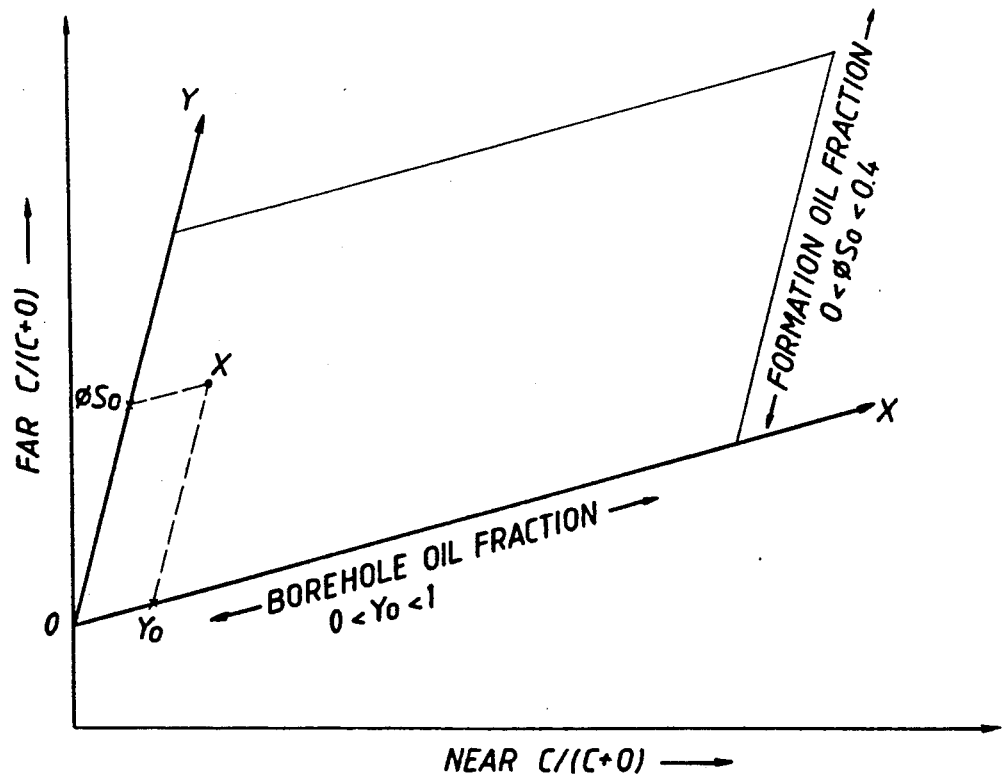
FIG. 7 depicts how the oil fraction in the formation "PHI $S_o$" and in the borehole "$Y_o$", is determined, on a cross-plot of C/(C+O) yields, from the associated parallelogram.

According to the present invention, each elemental yield (i.e. at each depth) for carbon (or any combination of carbon and oxygen) from the far detector is plotted against the elemental yield(s) from the near detector, for the same depth. FIGS. 4-6 show diagrammatic examples of the plots obtained from plot of respectively C/(C+O) yields (FIG. 4), C yields (FIG. 5) and C/O yields (FIG. 6). Each point or dot on the plot corresponds to the gamma ray response representative of an unknown at a given depth in the borehole.

Applicant discovered that all the data points representative of the gamma ray responses, when plotted one against the other in a multidimensional space, define altogether a closed curve. In a two dimensional space, i.e. using two detectors, the region is a two dimensional curve. The closed curve is made of a polygon, and more particularly a quadrilateral. The general shape of the curve depends on the type of gamma ray response (e.g. elemental yields) and on the general relationship between the responses and the unknown, as it will be explained later.

Figure 2:
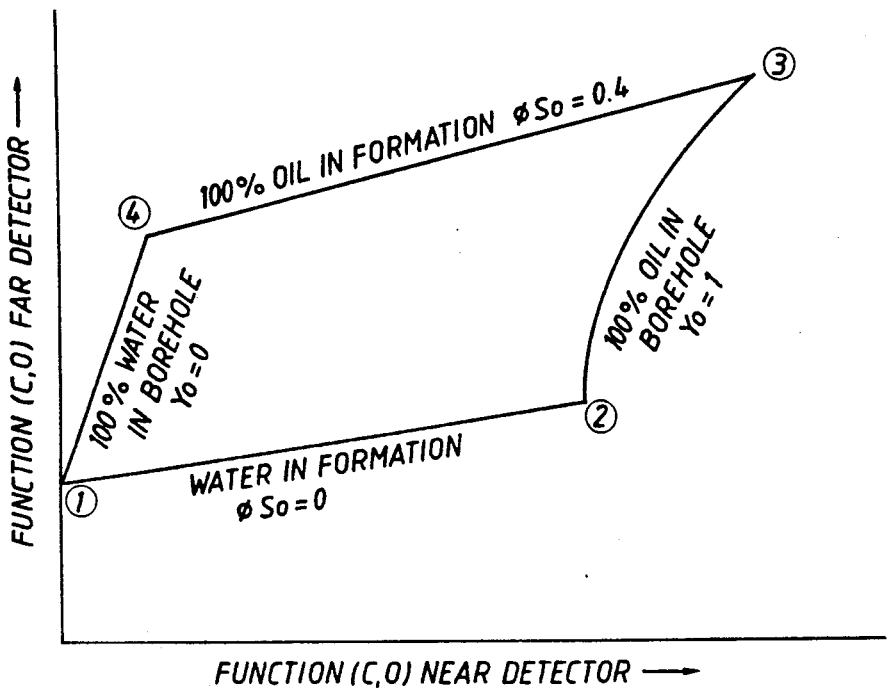
FIG. 2 shows the general shape of a quadrilateral obtained from the plot of a combination of carbon C and oxygen O elemental yields from respectively the near and far detectors.

The closed curve may have the general shape exhibited on FIG. 2 where are plotted the "far detector" responses (vertical axis) against the "near detector" responses (horizontal axis). Each of the four corners of the curve has a significance in term of contribution to the unknown respectively from the borehole and the formation. In the instance where the plotted responses are the elemental yields of carbon and oxygen, each corner represents the maximum amount of the element (or combination of elements) of interest in the borehole and/or the formation. More precisely, referring to FIG. 2, corner 1 corresponds to the situation where the element is absent from both the formation and the borehole fluid; the response is different from zero to account for the presence of the element of interest in the tool itself or in the formation matrix. Corner 2 refers to the borehole containing the maximum amount of the element, while the element is absent from the formation fluid. Corner 3 is reached when both the formation and the borehole contain the maximum amount of the element. Corner 4 stands for the situation in which the formation contains the maximum amount of the element while the element is absent form the borehole. It has to be noted that the notions o "maximum" and "absent from" have a relative meaning. In particular, "absent from" is to be construed as meaning that no significant response has been obtained for the element from the borehole (or the formation).

Still referring to FIG. 2, each side of the curve connecting two corners has a particular significance. Side connecting corners 1, 2 (identified as side 1, 2) corresponds to a nil value of the unknown for the formation. Side 2, 3 relates to the maximum amount of the unknown in the borehole. Side 1, 4 corresponds to a nil value of the unknown in the borehole. Side 4, 3 refers to the maximum amount of the unknown in the formation.

By way of example, let the responses comprise carbon C and oxygen yields O, obtained respectively for the near and the far detector, noted $C^f$, $C^n$, $O^f$, $O^n$. U.S. Pat. No. 4,937,446 to McKeon, Roscoe & Stoller, and assigned to Schlumberger Technology Corporation, gives an example of a general relationship between the responses, i.e. C and O yields, and the unknown, i.e. the oil fraction. According to the teaching of the above mentioned patent, the total carbon and oxygen measured are assumed to be equal to the sum of the carbon and oxygen yields from the rock matrix of the formation, the pore space fluid, and the borehole fluid. Then, the general relationship between the responses $C^f$, $C^n$, $O^f$, $O^n$ and the unknown ($S_o$, $Y_o$) is e.g. of the form:

$$C^f = h^f + i^f S_o + j^f Y_o \tag{1}$$

$$C^n = k^n + l^n S_o + p^n Y_o \tag{2}$$

$$O^f = q^f + r^f S_o + t^f Y_o \tag{3}$$

$$O^n = v^n + w^n S_o + x^n Y_o \tag{4}$$

where "$S_w$" and "$Y_w$" are the water fraction in the formation and in the borehole, respectively, with $S_o = 1 - S_w$, and $Y_o = 1 - Y_w$. The coefficients $h^f$, $i^f$ $j^f$, $n$, $l^n$, $p^n$, $q^f$, $r^f$, $t^f$, $v^n$, $w^n$ and $x^n$ are determined under laboratory conditions by taking at least three measurements under the same conditions except for varying $S_o$ and $Y_o$, $S_w$, and $Y_w$.

According to the invention, from the general relationship is derived, for each side of the quadrilateral, a mathematical function expressing the correspondence between the first responses and the second responses. In case the curve is a quadrilateral, there are thus four functions, one for each side. The general form of such function can be expressed as:

$$FR = g(SR) \tag{5}$$

where "FR" stands for first responses, "SR" for second responses. The linearity of the sides depends on the functions "g".

Now is depicted, in connection with the example of the responses being C yields, how functions "g" are derived from the general relationship between the responses and the unknown. As stated above, with each side correspond a nil value of $S_o$ or $Y_o$. For example, to side 1, 2 is associated $S_o = 0$. Thus, equations (1) and (2) become:

$$C^f = h^f + j^f Y_o \tag{6}$$

$$C^n = k^n + p^n Y_o \tag{7}$$

combining equations (6) and (7) provides for the elimination of $Y_o$, and thus for the function "g" for side 1, 2:

$$C^f = g(C^n) = h^f + j^f(C^n - k^n)/p^n \tag{8}$$

Equation (8) shows the function "g" is linear. In the example where the responses are formed of the ratio of C/0 yields, a similar calculation based on equations (1), (2), (3) and (4) leads to the determination of the corresponding functions "g" which are of the form:

$$[C/O]^f = (a + b[C/O]^n)/(c + d[C/O]^n) \tag{9}$$

where "a-d" are coefficients derived from known coefficients $h^f$, $i^f$ $j^f$, $n$, $l^n$, $p^n$, $q^f$, $r^f$, $t^f$, $v^n$, $w^n$ and $x^n$ of equations (1-4).

Herebelow is described, in connection with the examples shown on FIG. 2-7, how is determined according to the invention, the curve representative of the gamma ray responses, as well as how is derived the unknown from the data points and the curve.

The closed curve shows a general quadrilateral shape. More precisely, on a plot of C/(C+O) yields (see FIG. 3 & 4), and on a plot of C yields (see FIG. 5), the curve is a parallelogram. For a given type of curve, the geometrical characteristics (slope and length of the sides) of the curve are a function of the sensivity of the detectors respectively to the borehole and the formation. The sensitivity depends on the geometrical conditions of the measurements. In the example of the curve being a parallelogram, the slopes of the sides depend on factors such as the geometry of the borehole, the position of the tool in the borehole, the casing eccentricity. The lengths of the sides of the parallelogram are representative of the sensitivity of the measurements to the fluid. In the examples shown on FIG. 3–5, the length of the long sides depend on the amount of fluid in the borehole (mainly a function of the casing inner diameter) and on the sensitivity to the borehole fluid. The lengths of short sides depend on the sensitivity of the detection to the formation fluid and the porosity.

The successive steps of the method of the invention will be herebelow described in detail.

The inelastic gamma rays received by the respective two detectors, are counted and processed so as to form, for each depth, a response constituted e.g. by either the carbon yield or a combination of carbon and oxygen yields. The yields may be determined by any known method, as the one indicated above. The responses for the far detector are then plotted against the responses for the near detector, at each depth. Alternately, the "near responses" could be plotted against the "far responses". Each dot on the plot represents a set (in that case a couple) of responses for that depth, i.e. a near detector response and a far detector response. The responses altogether might be distributed on the plot so as to form a first and a second cloud (FIG. 4–6).

Figure 3:
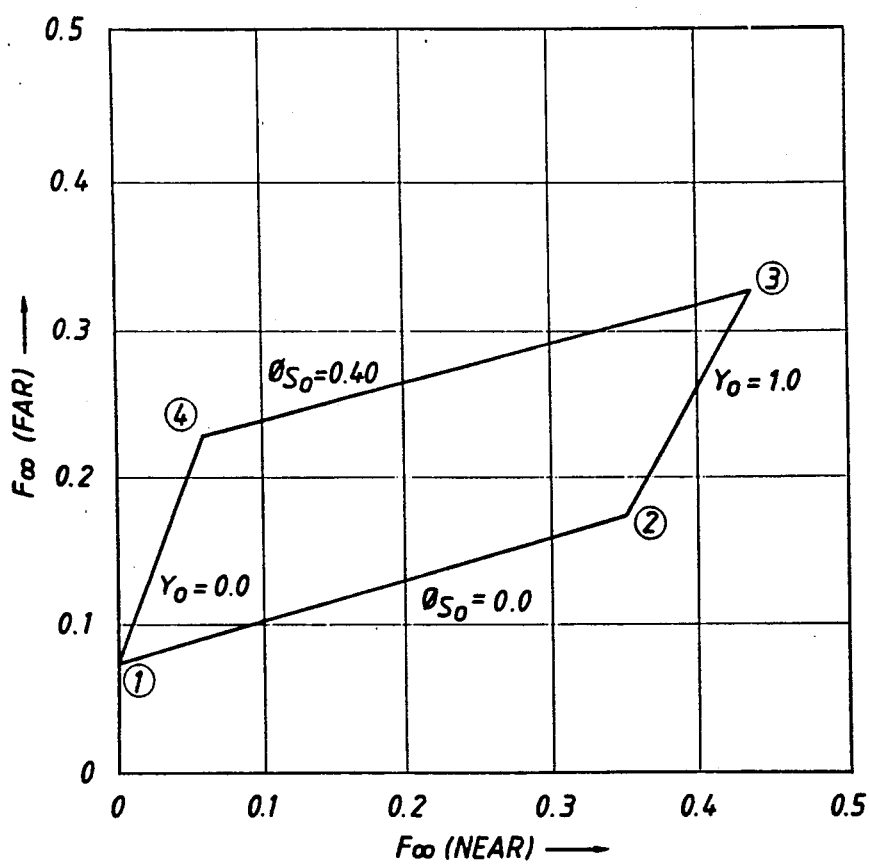
FIG. 3 shows a cross-plot of C/(C+O) elemental yields ratio and the associated parallelogram.

The next step is to assert the type of closed curve, depending on the type of response used. As already stated, the curve is e.g. a parallelogram in the case of a plot of C/(C+O) yields (FIGS. 3 & 4). The lengths and the slopes of the sides of the parallelogram are determined from factors representative of the conditions of the detection, as indicated above, such as the borehole geometry, the amount of fluid or the casing eccentricity.

In the following step, part of the data points, e.g. the first cloud of data (closer to the far detector axis), is used to define either the slope or the position, or both, of the corresponding side of the parallelogram, by using conventional mathematical techniques such as least squares regression. In the example of FIG. 3 & 4, the first cloud defines the position and/or the slope of the short side close to the far detector axis.

The final step is the determination of the unknown, i.e. the oil fraction, according to the examples shown on the figures. The unknown actually comprises two values to be determined, i.e. the oil fraction in the formation, "PHI $S_o$", and the oil fraction in borehole, "$Y_o$". The determination of the unknown will be hereafter described in connection with FIG. 7 which shows a plot of C/(C+O) yields and the associated curve, in that case a parallelogram. The long side of the parallelogram represents the possible values for "$Y_o$", comprised between 0 and 1. The short side represents the possible values for "PHI $S_o$" comprised between 0 and a maximum value (0.4) function of the porosity. Let "X" be on the plot a response corresponding to a given depth. In the coordinate system (x, y) constituted by the long and the short sides of the parallelogram, the coordinates of dot "X" represents respectively the borehole oil fraction "$Y_o$" and the formation oil fraction "PHI $S_o$", for the depth at stake. For each response on the plot, i.e. for each depth, is determined a borehole oil fraction and a formation oil fraction.

It has to be noted that a given unknown can be determined from different types of responses, i.e. from different plots. Thus, the unknown values coming from two or more plots could be checked one against the other for confirmation purposes. By way of example, the oil fraction may be derived from both a plot of C yields (FIG. 5) and a plot of C/(C+O) yields (FIGS. 3 & 4).

The general concept of the invention extends beyond the hereabove description.

The use of a graphical representation, i.e. a plot and a curve, is not mandatory for the determination of the unknown. The determination of the unknown can also be done by calculations without using any graphics, plot, curve or similar. The graphical representation constitutes an additional benefit to the user in allowing the same to have a better understanding of the results, and above all to check quickly the correctness of the prior information from other sources which has been used, as well as the validity or reliability of certain measured data. In particular, all the dots representative of the responses are supposed to be included in the closed curve. Also, it has to be born in mind that the responses are statistical by nature, and thus with each dot, representative of a set of of responses for a given depth, is associated an error bar, not shown on the figures for the sake of clarity.

In general terms, the method of the invention could be summarized in the following steps, once the responses are established:

(1) Transposing the responses in a multi-dimensional space, or multi-axis coordinate system, so that each set of responses for a given depth is represented by a dot in that space. There are as many dimensions as detectors. In the examples of the figures, the space is a two dimensional coordinate system, first detector versus second detector, and the set of responses is made of a couple of first and second responses. Also, each detector is mainly responsive to gamma rays coming form a given zone in the formation and borehole. There are thus as many detectors as zones; consequently, there are as many zones as values of the unknown to be determined. In the example of two detectors, the respective zones are the borehole and the formation. In case of three detectors, the respective zones could be e.g. the borehole per se, the casing/cement and the formation.

(2) Determining and positioning in that space a closed region characteristic of the relative contributions of the respective zones in the responses. The "region" has been referred to as a "curve" in a two dimensional space, which itself has been referred to a cross-plot.

(3) Deriving from the closed region a new coordinate system in which the axis correspond to the respective values of the unknown in the zones.

(4) Deriving from the coordinates of each set of responses in the new coordinate system, the values of the unknown for the respective zones.

Also, more particularly, elements other than carbon and oxygen (as hereabove depicted) could be used, such as e.g. Si, Ca, Fe, S, Mg. For example, one could establish, for lithology determination, responses of the following forms: Si/Ca, Si/(Ca+Si), or Si/(Ca+Si+Fe). Furthermore, the method of the invention could be based on the detection of "capture" gamma rays, instead of "inelastic" gamma rays as hereabove described, for one or several of the following elements: H, Cl, Si, Ca, S, Fe, Ti, Al, K, Na. E.g. for porosity measurements (capture gamma rays), one could establish the following yields: H or H/(Si+Ca). Moreover, the responses which might be used are not limited to elemental yields but also comprise the total count rate of gamma rays, measured in specific energy windows, such as shown on the cross-plot of FIG. 6. Finally, the sonde might comprise more than two detectors; the corresponding responses would be plotted on a three (or more) axis coordinate system.

What is claimed is:

1. A method for determining the respective contributions in spectroscopy measurements of the borehole and the earth formations surrounding the borehole, comprising:

irradiating the formation with neutrons from a high energy neutron source;

detecting and counting, at each depth in the borehole, at least a first and a second location, the gamma rays resulting from the interaction of the neutrons with atoms of the formation and the borehole;

forming, for each depth, a first and a second gamma ray response for respectively said first and second detection location, the responses being representative of at least an unknown parameter of the formation and/or the borehole;

cross-plotting each of said first responses versus the corresponding second response; thus, with each depth is associated on said cross-plot a dot representing the set of first/second responses for that depth;

deriving from known conditions of the detection, and from the general relationship between said responses and said unknown parameter, a closed curve characteristic of the relative contributions of the borehole and the formation in said responses; and determining, for each depth, the respective values of the unknown for the borehole and for the formation, from the position on said cross-plot of the set of of responses for that depth, with respect to said region.

2. The method according to claim 1 wherein said general relationship is linear and said closed curve shows the general form of a quadrilateral each side of which defines the boundary value (maximum/minimum) of said unknown in the corresponding partition borehole/formation.

3. The method according to claim 1 wherein the step of deriving the values of said unknown comprises:

asserting the general shape of the closed curve depending upon the general relationship between said responses and said unknown;

deriving geometrical characteristics of said curve from known conditions of the detection;

deriving from at least a first part of the responses the position of the curve on the cross-plot; and deriving for each depth, from the coordinates of each of the plotted responses for that depth, on the coordinates system issued from the curve, the values of the unknown for the borehole and the formation.

4. The method according to claim 3 wherein said first part of the responses allows to derive further geometrical characteristics of said curve.

5. The method according to claim 4 wherein said geometrical characteristics comprise the slope and length of the lines connecting two corners of said curve.

6. The method according to claim 1 wherein the position of said curve on said cross-plot is derived from prior information obtained from other sources.

7. The method according to claim 6 wherein said prior information is based on the knowledge of the kind of liquid (oil or water) filling the borehole at a given depth and wherein said curve is bound to pass through the dot representing the set of first/second responses for that depth.

8. The method according to claim 1 wherein a second part of the plotted responses is used to check the correctness of the shape, dimensions and/or position of said curve.

9. The method according to claim 1 wherein the gamma ray responses comprise the elemental yields of at least an element present in the formation and/or in the borehole, comprising carbon, oxygen, calcium, iron, silicon, chlorine, iron, potassium, magnesium, aluminum or hydrogen, or any combination thereof.

10. The method according to claim 1 wherein said responses are made of elemental yields of a single element.

11. The method according to claim 1 wherein said responses are made of elemental yields of several elements comprising silicon (Si), chlorine (Cl), hydrogen (H), iron (Fe) or calcium (Ca).

12. The method according to claim 11 wherein from said elements are derived yields ratio in the form of Cl/(Si+Ca), Si/Ca, Si/(Ca+Si), Si/(Ca+Si+Fe), or H/(Si+Ca).

13. The method according to claim 9 wherein said elements comprise carbon (C) and oxygen (0), said unknown being the fraction of oil volume, respectively in the formation and in the borehole.

14. The method according to claim 1 wherein said curve is a quadrilateral.

15. The method according to claim 14 wherein the slopes of the sides of the curve depend on geometrical factors of the detection step, and wherein the lengths of the sides of the curve depend on the fluid present in the formation and in the borehole.

16. The method according to claim 1 wherein said detecting step is carried out with a near detector and a far detector, longitudinally disposed on one side of said neutron source, and wherein said first gamma ray responses from said far detector are plotted against said second gamma ray responses from said near detector.

17. The method according to claim 1 wherein said detecting step is carried out with two detectors radially facing each other, separated by a shielding disposed in between.

18. The method according to claim 1 wherein said detecting step is completed at three longitudinally spaced detection locations.

19. The method according to claim 1 wherein said responses are made of total count rates measured in specific energy window(s).

20. A method for determining the respective contributions in spectroscopy measurements of the borehole and the earth formations surrounding the borehole, comprising:

irradiating the formation with neutrons from a high energy neutron source;

detecting and counting, at each depth in the borehole, at least at a first and at a second location, the gamma rays resulting from the interaction of the neutrons with atoms of the formation and the borehole;

forming, for each depth, at least a first and a second gamma ray response for respectively the first and second detection location, the responses being representative of values of at least one unknown parameter in respective zones in the formation/borehole;

cross plotting each of said first responses versus at least the corresponding second response, in a space having a number of dimension equal to the number of detection locations; with each depth is associated in said space a dot representing the set of responses for that depth;

determining in said space, from the general relationship between the responses and the unknown parameter and from known conditions of the detection, a closed region characteristic of the relative contributions of said respective zones; and determining, for each depth, the respective values of the unknown parameter for said zones, from the position, in said space, of said set of responses for that depth, with respect to said closed region.

21. Method according to claim 20 further comprising the step of deriving, from said general relationship, mathematical functions of the first responses versus at least the second responses, representative of the respective boundaries of said region.

22. Method according to claim 20 wherein said space is a two dimension space, and said boundaries are expressed by respective functions of the form: FR=g(SR), where "FR" stands for first responses and "SR" for second responses.

23. The method according to claim 22 wherein said responses are C/0 yields ratios, said functions being of the form: FR=(a+b SR)/(c+d SR), where "a-d" are coefficients.

24. The method according to claim 22 wherein said responses are (C−0)/(C+0) yields ratios, said functions being of the form: FR=m+n SR), where "m, n" are coefficients.

25. The method according to claim 20 wherein said detecting step is carried out by a near and a far detector, said zones being the borehole and the formation, and said set of responses being made of a couple of responses.

26. The method according to claim 25 wherein said region is a quadrilateral, two concurrent sides of said quadrilateral defining a coordinate system in which the coordinates of a set of responses for a given depth, correspond to the values of said unknown in said zones being respectively the formation and the borehole.

27. A logging apparatus for determining the respective contributions in spectroscopy measurements of the borehole and the earth formations surrounding the borehole, comprising:

means for irradiating the formation with neutrons from a high energy neutron source;

means for detecting and counting, at each depth in the borehole, at at least a first and a second location, the gamma rays resulting from the interaction of the neutrons with atoms of the formation and the borehole;

means for forming, for each depth, a first and a second gamma ray response for respectively said first and second detection location, the responses being representative of at least an unknown parameter of the formation and/or the borehole;

means for cross-plotting each of said first responses versus the corresponding second response; thus, with each depth is associated on said cross-plot a dot representing the set of first/second responses for that depth;

means for deriving from known conditions of the detection, and from the general relationship between said responses and said unknown parameter, a closed curve characteristic of the relative contributions of the borehole and the formation in said responses; and means for determining, for each depth, the respective values of the unknown parameter for the borehole and for the formation, from the position on said cross-plot of the set of responses for that depth, with respect to said region.

28. The apparatus according to claim 27 wherein said general relationship is linear and said closed curve shows the general form of a quadrilateral each side of which defines the boundary value of the unknown parameter in the corresponding partition borehole/formation.

29. The apparatus according to claim 27 wherein said means for deriving the values of said unknown parameter comprises:

means for asserting the general shape of the closed curve depending upon the general relationship between said responses and said unknown parameter;

means for deriving geometrical characteristics of said curve from known conditions of the detection;

means for deriving from at least a first part of the responses the position of the curve on the cross-plot: and means for deriving for each depth, from the coordinates of each of the plotted responses for that depth, on the coordinates system issued from the curve, the values of the unknown parameter for the borehole and the formation.

30. The apparatus according to claim 27 wherein said means for detecting comprises a near detector and a far detector, longitudinally disposed on one side of said neutron source, and wherein said first gamma ray responses from said far detector are plotted against said second gamma ray responses from said near detector, and wherein said curve is a quadrilateral.

31. The apparatus according to claim 27 wherein the gamma ray responses comprise the elemental yields of at least one element present in the formation and/or in the borehole, where is said element is carbon, oxygen, calcium, iron, silicon, chlorine, iron, potassium, magnesium, aluminum or hydrogen, or any combination thereof.

32. The apparatus according to claim 27 wherein said responses are made of elemental yields of several elements comprising silicon (Si), chlorine (Cl) or calcium (Ca), hydrogen (H) or any combination thereof.

33. The apparatus according to claim 27 wherein said means for detecting comprises two detectors radially facing each other, separated by a shielding disposed in between.

34. The apparatus according to claim 27 wherein said means for detecting comprises three longitudinally spaced detectors 35. The apparatus according to claim 27 wherein said responses are made of total count rates measured in specific energy window(s).

36. An apparatus for determining the respective contributions in spectroscopy measurements of the borehole and the earth formations surrounding the borehole, comprising:

means for irradiating the formation with neutrons from a high energy neutron source;

means for detecting and counting, at each depth in the borehole, at least at a first and at a second location, the gamma rays resulting from the interaction of the neutrons with atoms of the formation and the borehole;

means for forming, for each depth, at least a first and a second gamma ray response for respectively the first and second detection location, the responses being representative of values of at least one unknown parameter in respective zones in the formation/borehole;

means for cross plotting each of said first responses versus at least the corresponding second response, in a space having a number of dimension equal to the number of detection locations; with each depth is associated in said space a dot representing the set of responses for that depth;

means for determining in said space, from the general relationship between the responses and the unknown parameter and from known conditions of the detection, a closed region characteristic of the relative contributions of said respective zones; and means for determining, for each depth, the respective values of the unknown parameter for said zones, from the position, in said space, of said set of responses for that depth, with respect to said closed region.

37. The apparatus according to claim 36 wherein said means for detecting comprises a near and a far detector, said zones being the borehole and the formation, said set of responses being made of a couple of responses, and wherein said boundaries of said region are expressed by respective functions of the form: $FR=g(SR)$, where "FR" stands for first responses and "SR" for second responses.

38. The apparatus according to claim 36 further comprising means for deriving, from said general relationship, mathematical functions of the first responses versus at least the second responses, representative of the respective boundaries of said region.

* * * * *